United States Patent [19]

Stodt

[11] 3,865,259
[45] Feb. 11, 1975

[54] SILO FOR BULK MATERIAL

[75] Inventor: Eberhard Stodt, Dusseldorf, Germany

[73] Assignee: Lindemann Maschinenfabrik GmbH, Dusseldorf, Germany

[22] Filed: Nov. 8, 1972

[21] Appl. No.: 304,635

[30] Foreign Application Priority Data
Oct. 23, 1972 Germany.............................. 2246877

[52] U.S. Cl. ................................. 214/17 C, 100/95
[51] Int. Cl. .............................................. B65g 65/32
[58] Field of Search ......... 214/17 C, 17 D, 18 R, 23

[56] References Cited
UNITED STATES PATENTS
1,769,236   7/1930   Schellentrager ...................... 214/23
3,173,389   3/1965   Cates et al. .................... 214/18 R X
3,252,600   5/1966   Brisson et al. .................. 214/83.3 X
3,724,689   4/1973   Sugawara et al. ..................... 214/36

Primary Examiner—Robert G. Sheridan
Attorney, Agent, or Firm—Toren, McGeady and Stanger

[57] ABSTRACT

The invention is concerned with a silo for bulk material such as garbage. The silo has a chamber with an inlet chute in one wall, and a reciprocating pusher mounted beneath the chute operates through the wall to displace into the chamber material upon dropping down into the chamber from the chute, builds up in conical formation at its natural angle of repose against the wall of the chamber.

7 Claims, 3 Drawing Figures

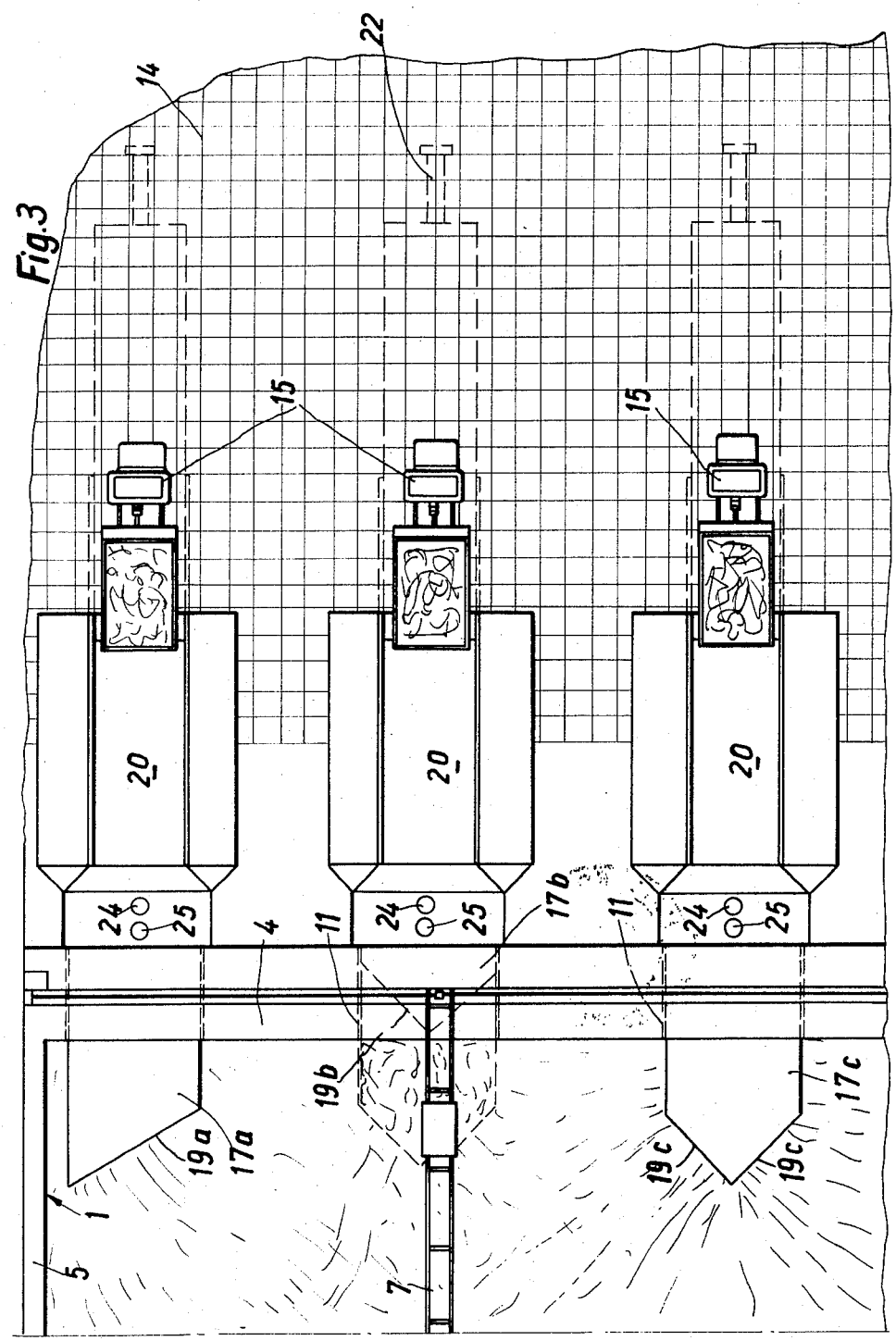

SILO FOR BULK MATERIAL

Bulk materials are often stored in silos from which they are subsequently discharged for further processing as and when required. The bulk material often reaches the silo at highly irregular intervals and in irregular quantities. This applies particularly to garbage and other rubbish. Furnaces for burning garbage are therefore usually equipped with large-area feed silos. The bulk material is usually charged into the silo through at least one inlet opening, the material entering the silo from above and from the side.

When loose material is heaped up on a level surface it forms a cone whose cone angle is the angle of repose of the particular material. On the other hand loose material which is charged into a silo from above and from the side, as mentioned above, forms a half-cone against the wall of the silo, with a fairly variable angle of repose.

Consequently a silo which is filled in this way is always only partly filled. This applies even to a round silo which has inlet openings all around its periphery. In this case the loose material builds up around the wall, in the form of overlapping half-cones, leaving an empty space in the middle.

A further difficulty arises in conveying the heaped material from the silo to the downstream processing equipment. In the case of garbage this is usually a garbage-burning furnace. Material heaped up in the silo in the form of half-cones bounded by more or less steep angles of repose is difficult to handle, due to the inclination of the surface. The material is usually lifted and discharged from the silo by a suspended multiple-claw grab. A grab of this kind can easily grasp loose material which has a reasonably horizontal surface, but if the surface of the material is inclined, that is to say if the device has to grab the material from a sloping surface, difficulties arise. The grab tends to tip over sideways, disengaging its cables from the pulleys or getting them jammed.

The object of the present invention is to provide a device for improving the operation of silos of the kind mentioned at the beginning. More particularly the device is intended to remove the difficulties which result from the shape of the heap of loose material which is naturally formed, the difficulties being mainly due to the angle of repose.

A further object is to provide a device which allows the silo to be filled much more completely and which also allows the material to be discharged from the silo in an easier, simpler and more reliable manner.

The problem is solved according to the invention in that under the or each charging opening there is a horizontally acting pusher whose working face, thrusting against the loose material charged through the inlet opening and resting on the silo bottom and pushing it along, distributes it more evenly over the silo bottom.

The working face of the pusher is preferably approximately vertical. The pusher thus repeatedly pushes the top off the cone or half-cone of material, or pushes away the tops of incipient cones, distributing the material more evenly in the silo and forming an at least approximately level surface. This allows the silo to be filled at least approximately to its capacity. From the approximately level surface the material can be removed with comparative ease by a multiple-claw grab or the like.

The working face of the pusher may form an acute angle with the direction of advance of the pusher. The pusher therefore pushes the material not only forwards but also sideways. If the pusher is situated centrally in the silo, as is the case for example in a silo which has only one inlet opening, the working face of the pusher has at least two working surfaces inclined in opposite directions in the manner of an arrow head. On the other hand in those cases where at least one inlet opening is situated near a corner of the silo, the working face of the pusher under this opening is either inclined away from the adjacent side wall or consists of two or more working surfaces all inclined in this manner.

A comminuting device may be provided upstream of the charging inlet. The size-reducing of the material facilitates its further processing.

A compacting device can if desired also be installed upstream of the charging inlet, or upstream of the comminuting device, the compactor also making further processing of the material easier.

If the Inlet opening is preceded upstream by a comminuting and/or a compacting device, a convenient arrangement from the constructional point of view consists in that the comminuting and/or compacting device is preceded upstream by an open-topped feed trough into which the bulk material is tipped from above and a pusher which pushes the material in the trough as far as the compacting and/or comminuting device.

Two examples are represented diagrammatically in the drawing, in which:-

FIG. 3 is a plan of the FIG. 2 silo, and also shows certain details which are also present in the silo represented in FIG. 1.

Figure 1:
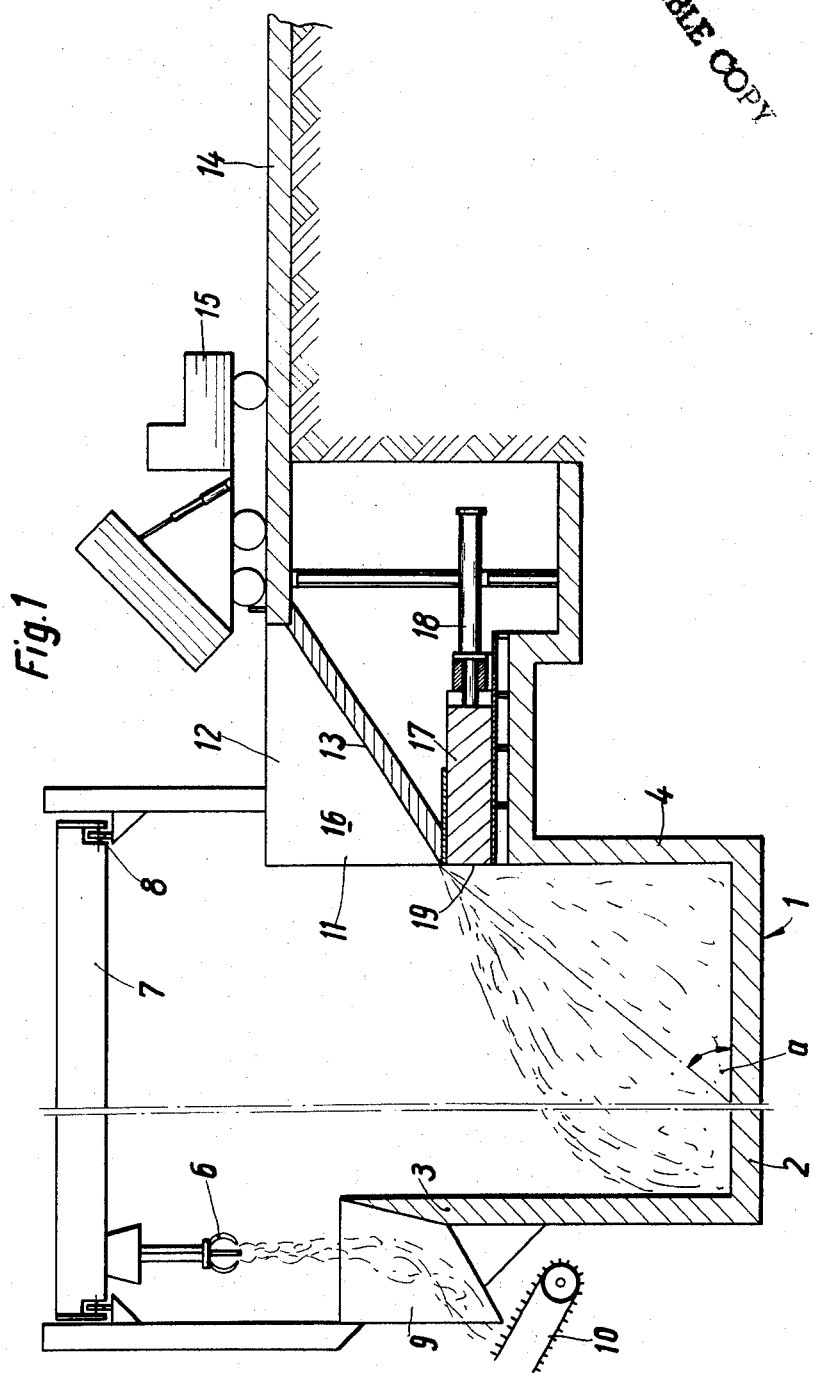
FIG. 1 is a longitudinal sectional view through a a large-area silo according to one embodiment of the invention.

In all three Figures the silo is indicated generally at 1. In each case the silo consists of a bottom 2, side walls 3, 4 and end walls 5. The silo is open at the top to allow operation of a multiple-claw grab 6 mounted on a runner trolley which runs transversely across the silo on a bridge 7 which itself travels on rollers 8 over the length of the silo, perpendicular to the plane of the paper in FIGS. 1 and 2. The elongated form of the silo can be seen in FIG. 3. One side wall 3 of the silo has a dischrage chute 9 through which the bulk material, for example garbage, falls when it has been released by the grab 6. The material discharged through the chute 9 is taken away by a belt or chain conveyor 10, which conveys it to a garbage-burning furnace, in a manner which is not a part of the present invention.

Opposite the wall 3 the side wall 4 has a number of openings 11 through which the silo 1 is fed with the bulk material. In FIG. 1 each side opening 11 is the delivery opening of a feed chute which is open at the top. The feed chute has side walls 12 and a sloping floor 13. The garbage arrives in a tip truck 15 which reverses on a ramp 14 until it is in position to tip the garbage into the feed chute. The garbage slides downwards over the sloping chute floor 13 which feeds the garbage at its lower end into the silo 1, as shown in FIG. 1.

Arriving in the silo the garbage would, unless steps are taken to prevent it, accumulate in a heap on the bottom of the silo, forming an angle of repose a. The heap of loose material accumulating under each feed opening 11, that is to say under each filling station, would form a half cone, as indicated in FIG. 1. The half cone would build up until its apex reaches the lower lip of the chute floor 13 and after this further material tipped into the feed chute would build up, at least to a large extent, in the interior 16 of the feed chute, between the side walls 12. The storage capacity of the silo would be very incompletely utilised. Furthermore the multiple-claw grab 6 lowered onto a steeply sloping surface would be operating under highly adverse conditions, as already explained above. The function of the device which will now be described is to remedy these difficulties.

Under each filling station, consisting of a feed opening 11 and a sloping chute floor 13, there is a horizontally reciprocating pusher 17 which is driven by the piston of a double-acting hydraulic cylinder 18. When the loose material has built up in the silo approximately up to the lower lip of the chute floor 13, as indicated by the chain lines in the Figure, the cylinder 18 is energised, driving the pusher horizontally across the upper part of the half-cone of loose material, the face 19 of the pusher distributing the material so that it eventually fills the silo more or less completely. The pusher 17 can still function effectively even if the loose material has built up to well above the lower lip of the chute floor 13. In FIG. 1 a considerable quantity of material has already been distributed by the pusher 17, which has pushed the material out beyond the surface of the half cone. Ultimately it is possible to fill the silo in such a way that the upper surface of the loose material forms an almost horizontal surface.

FIG. 3 shows pusher faces 19 arranged in different ways. In FIG. 3 it is assumed that the silo has more than three filling stations and therefore more than three pushers 17. Two pushers are near the end walls 5, only one of which is shown in the Figure. This pusher is shown at 17a. The vertical pusher face 19a forms an acute angle with the direction of movement of the pusher 17a. The pusher face 19a therefore pushes the loose material not only forwards but also sideways towards the middle of the silo. The other two pushers 17b and 17c in FIG. 3 are "middle" pushers, as described at the beginning. Each of these pushers has a pusher face consisting of two parts 19b and 19c, each forming an acute angle with the direction of movement of the pusher, but in opposite directions. Each of these pushers 17b and 17c pushes the material forwards and outwards towards each side. As already mentioned, pusher faces can if desired be arranged in various other ways. For example the pusher face 19a of the pusher 17a can be arranged in the form of two pusher faces forming different angles, although in the same direction, with respect to the direction of advance of the pusher. The same thing applies to the pushers 17b and 17c.

Figure 2:
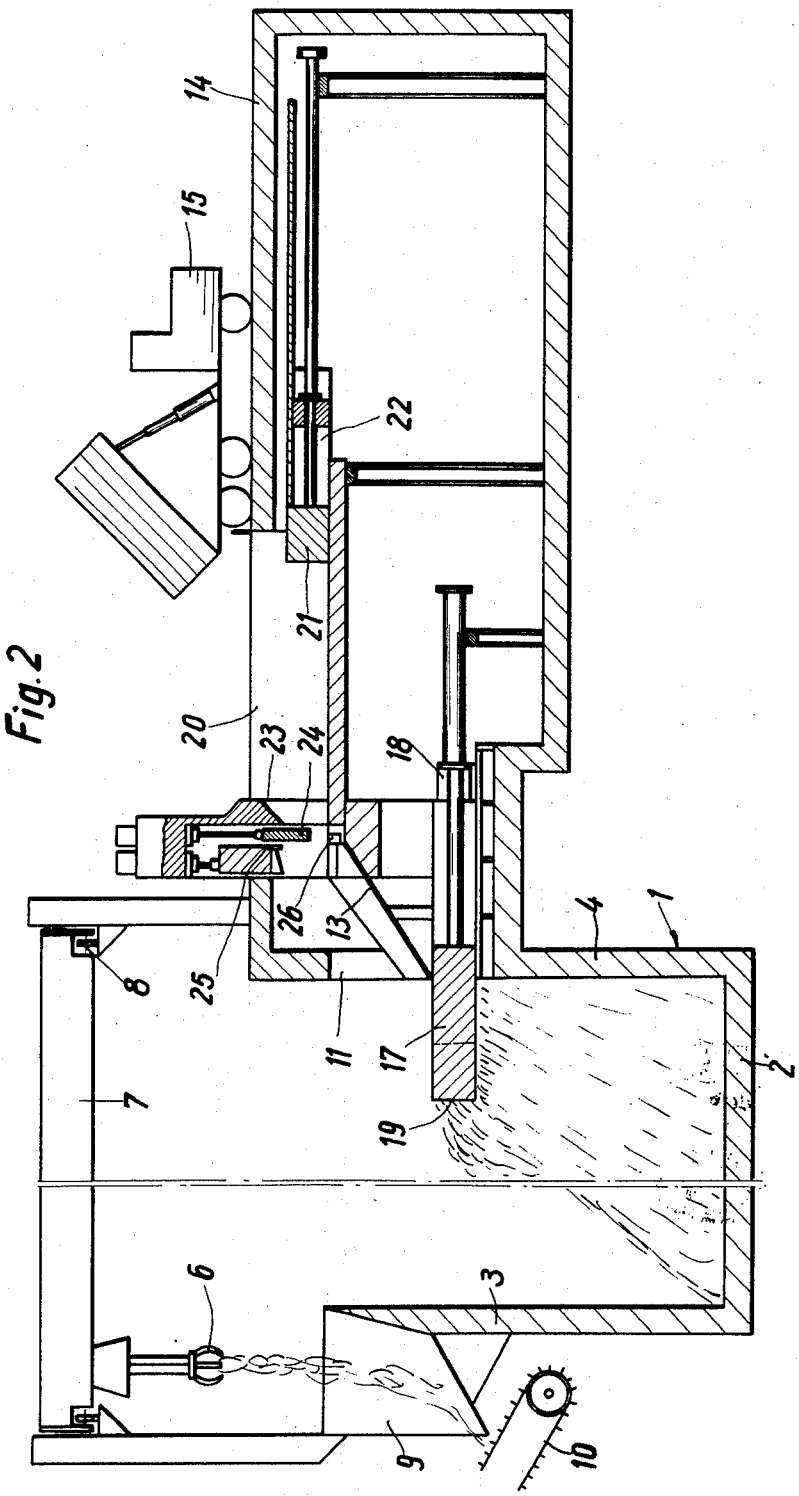
FIG. 2 is a view similar to FIG. 1, but showing an alternate embodiment of the invention.

The example shown in FIG. 2, whose details are also shown in FIG. 3, differs from the example shown in FIG. 1, in regard to the arrangements used for feeding the material to the sloping chute floor 13. In FIG. 1 the loose material is tipped directly from the tip truck 15 onto the sloping chute floor 13. In the example shown in FIGS. 2 and 3, on the other hand, the material is tipped from the truck into an open topped trough 20 equipped with a pusher 21 powered by a double-acting hydraulic drive 22. The pusher 21 pushes the material through a feed opening 23. Downstream of the feed opening 23 there are two tools, a compacting device 24 and a shears consisting of a mobile blade 25 and a stationary blade 26. The material advancing through the feed opening 23 is first of all compacted by the compactor 24 and can then if necessary be cut into comparatively short lengths by the shears 25, 26. The cutting can be necessary if the material contains very long pieces, not only to facilitate the filling of the silo 1 but also because shorter material is more easily handled by the furnace downstream of the discharge chute 9.

I claim:

1. A silo for processing bulk material comprising, in combination, a chamber having a storage volume defined by a plurality of upstanding side walls and a bottom, said side walls being configured to define said chamber with a substantial height dimension extending upwardly from said bottom within which said bulk material may be deposited, a charging inlet located in one of said side walls at the upper end of said chamber for introducing therethrough bulk material into said chamber, said charging inlet being spaced upwardly a substantial distance from said bottom in order to define between said bottom and said inlet substantially the entire volume of said chamber within which bulk material is contained, a charging edge located in the plane of said one side wall defining the lowermost limits of said charging inlet and extending substantially horizontally across said one side wall, pusher means having a length dimension extending generally pependicularly to said one side wall and a cross sectional configuration lying in a plane extending generally parallel to said one side wall, said cross sectional configuration extending substantially uniformly throughout the major portion of the length of said pusher means, guideway means located immediately below said charging edge contiguously thereto and extending from an opening located in said one side wall in a direction perpendicularly thereto outwardly from said chamber, said guideway means in said opening having a cross sectional configuration conforming substantially with said cross sectional configuration of said pusher means and being structured to have said pusher means guided therein for longitudinal movement generally perpendicularly to said one side wall into and away from the upper portions of said chamber, said guideway means and said pusher means being configured to extend for only a short distance downwardly of said charging edge taken relative to the overall length of said one side wall, with said opening of said guideway means substantially enclosing said pusher means about its periphery throughout substantially the entire length of the stroke of said pusher means, whereby bulk material accumulating at the top of said chamber may be distributed therein by operation of said pusher means without creating undesired openings in the walls of said chamber through which bulk material might inadvertently escape.

2. The combination of claim 1 wherein said pusher means include a plurality of pusher members spaced apart across said one side wall each located at a substantially equivalent height from said bottom contiguous with said charging edge, and wherein each of said pusher members comprise a working face located at the leading end thereof taken relative to the direction of travel of said pusher members into said chamber.

3. The combination of claim 2 wherein the working face of at least one of said pusher members essentially consists of a flat planar configuration extending in a vertical plane which is generally parallel to the plane of said one side wall.

4. The combination of claim 2 wherein the working face of at least one of said pusher members includes a planar surface extending at an acute angle to the direction of travel of said pusher member.

5. The combination of claim 2 wherein the working faces of at least two of said pusher members include, respectively, planar configurations inclined in opposing directions.

6. The combination of claim 2 wherein said plurality of pusher members include at least two outermost pusher members located horizontally apart on opposite sides of said one side wall, with the working faces of each of said pusher members including, respectively, a planar configuration inclined to urge said bulk material in a direction centrally of said one side wall.

7. The combination of claim 1 including a grab, means mounting said grab above said chamber at an elevation higher than the elevation of said charging inlet and of said pusher means, said mounting means including means for moving said grab vertically and horizontally relative to said chamber whereby said grab may be operated cooperatively with said pusher means to remove from said chamber bulk material distributed therein by operation of said pusher means.

* * * * *